US012523515B2

(12) United States Patent
Roberts

(10) Patent No.: US 12,523,515 B2
(45) Date of Patent: Jan. 13, 2026

(54) METER TEST BENCH FLOW STOP ASSEMBLY

(71) Applicant: The Ford Meter Box Company, Inc., Wabash, IN (US)

(72) Inventor: Peter Roberts, Rochester, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 380 days.

(21) Appl. No.: 18/191,456

(22) Filed: Mar. 28, 2023

(65) Prior Publication Data

US 2023/0314204 A1 Oct. 5, 2023

Related U.S. Application Data

(60) Provisional application No. 63/325,717, filed on Mar. 31, 2022.

(51) Int. Cl.
*G01F 25/00* (2022.01)
*G01F 13/00* (2006.01)
*G01F 15/00* (2006.01)

(52) U.S. Cl.
CPC .......... *G01F 25/0092* (2013.01); *G01F 13/00* (2013.01); *G01F 15/005* (2013.01)

(58) Field of Classification Search
CPC ..... G01F 25/0092; G01F 13/00; G01F 15/005
USPC .......................................................... 73/1.36
See application file for complete search history.

(56) References Cited

U.S. PATENT DOCUMENTS

| | | | |
|---|---|---|---|
| 3,888,106 A | 6/1975 | Last et al. | |
| 3,940,971 A | 3/1976 | Krause et al. | |
| 4,492,636 A * | 1/1985 | Burke | B01D 17/0205 |
| | | | 210/705 |
| 5,542,450 A * | 8/1996 | King | G01F 3/08 |
| | | | 251/366 |

(Continued)

FOREIGN PATENT DOCUMENTS

| | | |
|---|---|---|
| CN | 101408452 A | 4/2009 |
| CN | 202166907 U | 3/2012 |

(Continued)

OTHER PUBLICATIONS

Automated Measuring System Product Improvement; Ford Meter Box Company, Inc. AMS II; Dated May 2010.

(Continued)

*Primary Examiner* — Peter J Macchiarolo
*Assistant Examiner* — Rodney T Frank
(74) *Attorney, Agent, or Firm* — Barnes & Thornburg LLP

(57) ABSTRACT

A water meter test bench assembly that includes a fluid source, a discharge pipe, and check valve assembly, is provided. The fluid source also provides fluid pressure to move fluid through the at least one meter. The discharge pipe is fluidly coupled to a valve and configured to receive the fluid that passes through the at least one meter. The check valve assembly is attached to the discharge pipe and is in fluid communication with the opening of the discharge pipe. The check valve assembly is open when the fluid pressure from the fluid source moves the fluid through the at least one meter, the valve, and acts on the check valve assembly. When the fluid pressure is reduced sufficient to close the check valve assembly, the fluid is stopped from passing through the check valve assembly.

20 Claims, 13 Drawing Sheets

(56) References Cited

U.S. PATENT DOCUMENTS

| | | | |
|---|---|---|---|
| 5,574,229 | A | 11/1996 | Castillo |
| 9,188,492 | B2 | 11/2015 | Ha |
| 9,876,692 | B2 | 1/2018 | Lai |
| 9,891,089 | B2 | 2/2018 | Salser et al. |
| 9,898,089 | B2 | 2/2018 | Subramanian et al. |
| 2014/0020449 | A1 | 1/2014 | Ito et al. |
| 2014/0261824 | A1* | 9/2014 | Byers .................. B24B 57/02 137/896 |
| 2016/0096756 | A1* | 4/2016 | Wright ................. C02F 11/121 210/702 |
| 2018/0188101 | A1 | 7/2018 | Weindl |
| 2019/0107850 | A1 | 4/2019 | Kobayashi |
| 2019/0137321 | A1 | 5/2019 | Mastic et al. |
| 2020/0386589 | A1* | 12/2020 | Roberts ................. G01F 1/125 |

FOREIGN PATENT DOCUMENTS

| | | |
|---|---|---|
| CN | 202393466 U | 8/2012 |
| CN | 202453053 U | 9/2012 |
| CN | 105953870 A | 9/2016 |
| CN | 205826079 U | 12/2016 |
| CN | 106525205 A | 3/2017 |
| CN | 106643988 A | 5/2017 |
| KR | 101540247 B1 | 5/2015 |

OTHER PUBLICATIONS

Automated Measuring System Product Improvement; Ford Meter Box Company, Inc. AMS; Dated Dec. 2018.

Ford AMS (Automated Measuring System); Dated Mar. 2003.

Automated Measuring System Product Improvement; Ford Meter Box Company, Inc. AMS; Dated Jul. 2012.

Configuration Setup—Document Revision 001-Version:1; Dated Mar. 25, 2013.

Meter Testing-AMSII Revision 001-Version: 1; Dated Mar. 25, 2013.

Shanghai Powoo Industry Co., Ltd; Automatic Water Meter Test Bench.

Ti Sales; Ford Test Benches; Donna Tamburrini.

US Office Action Dated Apr. 15, 2025; U.S. Appl. No. 18/397,172; Automated Measuring System for Meter Test Bench.

* cited by examiner

METER TEST BENCH FLOW STOP ASSEMBLY

RELATED APPLICATIONS

The present application relates to and claims priority to U.S. Provisional Patent Application, Ser. No. 63/325,717, filed on Mar. 31, 2022. The subject matter disclosed in that Provisional Application is hereby expressly incorporated into the present application.

TECHNICAL FIELD AND SUMMARY

The present disclosure is directed to fluid meter test bench assemblies and, particularly, to a flow stop assembly for use on a fluid meter test bench assembly.

Fluid meters, such as water meters, are known devices that determine the volume of fluid passing through the meter. Most business and residential dwellings that have water service provided thereto, include a meter so the amount of water used in the dwelling can be determined. This is primarily used for billing purposes by a water provider.

A critical aspect of such fluid meters (e.g., water meters) is their accuracy. Being able to determine the correct flow rate of fluid, such as water passing through the meter, ensures the accuracy of the amount of water being used and, thus, the amount of money to be charged to a customer. Because fluid meters can have a long life cycle, having a testing program to determine their consistent accuracy is an important component to sustain their long-term use.

Both flow meter operation and testing methodologies have long been known. The flow measurement is essentially the measured velocity of flow (typically feet per second) multiplied by the inside cross-sectional area of the pipe. There are many flow meter mechanisms, such as displacement, turbine, venture, ultrasonic, and others that effectively determine the amount of water passing through the meter. Because it is important for the meter to read accurately during its life, the meter needs to be periodically tested. To do this, the meter is fluidly coupled to a "test bench" assembly where a known volume of water is passed through the meter. The meter is then read. If the meter reads the same amount as the known passed volume, the meter is reading accurately. If the meter reads either less or more, it is creating some percentage error.

As known in the art, meter accuracy may be defined as the quotient obtained by dividing a quantity of fluid registered during a test by the actual volume of fluid passed through the meter. For example, a meter registering nine gallons when 10 gallons passes through it has an accuracy of 9/10, or 90%. A meter registering 51 cubic feet on an actual volume of 50 cubic feet is 51/50, or 102% accurate. Meter accuracy may also be expressed in percentage, fast or slow. For example, a meter that records 95 gallons when 100 gallons are run through it, under-registers or is slow by 5%. Conversely, a meter registering 102 gallons on the same volume is 2% fast. In other words, these meters run 95% and 102%, respectively.

Because most dwellings that have water service include such meters, a large number of meters may need to be tested. It is, therefore, most convenient to test multiple meters at one time. To that end, a water meter test bench is known in the art where a plurality of meters are fluidly connected together in a series on a bench (hence the name). Typically, multiple meters are tested on this bench at one time. This is accomplished by first clamping each meter to the bench and fluidly connecting the meters in series. The meters are, thus, in fluid communication with a fluid or water source and a fluid or water outlet. The bench has a flow inlet fluidly coupled to the first of the meters at the inlet side. Air is purged from the meters by flowing water though all of the meters from the inlet side. At this point, water fills all the meters between the test bench inlet and the meters' outlets. Thereafter, each tested meter is read to determine its starting point. The outlet on the bench is then opened to move the water through each meter. The water exits the last meter, then through a discharge pipe, and deposits into a tank. At the end of the test, the flow of the meters are read again. The weight of fluid in the tank is measured to calculate the volume of fluid that has passed through the meters. Accordingly, this testing protocol is considered a volumetric test system. The calculated volume is then compared to flow readings calculated by comparing the initial and final readings of each meter. This determines each meter's accuracy.

Several of these functions of the water meter test bench may be manually or automatically controlled, such as the flow control of water passing through the meters, opening and closing the row selection valves to direct water flow, opening and closing the inlet and outlet valves to allow water to flow, and determining the volume of fluid that entered the tank.

As part of the basic configuration of the water meter test bench, as described above, there is an inlet valve in fluid communication between a fluid source and the row of fluidly connected meters. An outlet valve is fluidly connected between the row of meters opposite the inlet valve and a discharge pipe. The discharge pipe leads to the tank which collects the water that flows through the valves and out the discharge pipe. A sight glass on the tank indicates the present volume of fluid in the tank. During a flow meter test, when the volume in the tank reaches the predetermined volume of the test, the outlet valve is closed to stop the fluid flow. A problem with this is that when the outlet valve is closed, some water still remaining in the discharge pipe may deposit into the tank. It is often important that the final volume of fluid that deposited into the tank be as close as possible to the predesignated volume. This added fluid may skew results because the measured fluid in the tank will exceed the predetermined volume.

For example, if a meter test is set at 10 gallons to pass through the meters, once 10 gallons deposits into the tank, the outlet valve is shut off. At this point, however, several ounces of fluid may still deposit into the tank because the water in the discharge pipe is still moving. This may occur despite the outlet valve being closed. Therefore, at the end of the test, more than 10 gallons may have been deposited into the tank, which could skew the final results. It would be advantageous if fluid is no longer deposited into the tank once the outlet valve is closed.

Accordingly, an illustrative embodiment of the present disclosure provides water meter test bench assembly. The water meter test bench assembly includes a bench, a fluid inlet valve, an outlet valve, a discharge pipe, a tank, and a check valve assembly. The bench is sized to support at least one meter. The fluid inlet valve is in fluid communication with both a fluid source and an inlet on the at least one meter. The fluid source provides fluid pressure to move fluid through the at least one meter. The outlet valve is in fluid communication with the at least one meter opposite the fluid inlet valve. The outlet valve is at an outflow side of the at least one meter. The discharge pipe is fluidly coupled to an outflow side of the outlet valve to receive the fluid that passes through the at least one meter. The tank receives and collects the fluid from the discharge pipe. The check valve assembly is attached to and in fluid communication with the discharge pipe and the opening of the discharge pipe. The check valve assembly is open when the fluid pressure from the fluid source moves the fluid through the at least one meter and through the outlet valve and acts on the check valve assembly. The fluid pressure from the fluid source is sufficient to keep moving the fluid past the check valve assembly, into the discharge pipe, and into the tank from the opening of the discharge pipe. When the fluid pressure is reduced sufficient to close the check valve assembly, the fluid is stopped from passing through the check valve assembly.

In the above and other embodiments, the water meter test bench assembly also comprises: a reduction of fluid pressure allows a spring bias of the check valve assembly to push a member portion of the check valve assembly against a valve opening portion of the check valve assembly to close the check valve assembly, which stops the fluid from passing through the check valve assembly and collecting in the tank; the fluid pressure is reduced by closing the outlet valve; when the check valve assembly is closed, the fluid is stopped from entering the tank; when the check valve assembly is closed, the fluid is stopped from exiting the discharge pipe; the check valve assembly is located adjacent and in fluid communication with the opening of the discharge pipe; the check valve assembly being spaced apart from and in fluid communication with the tank; a member portion of the check valve assembly is a disc that is spring loaded against a valve opening portion of the check valve assembly to close the check valve assembly; the check valve assembly being selected from the group consisting of an inline valve, a single poppet valve, and a multiple poppet valve.

Another illustrative embodiment of the present disclosure provides water meter test bench assembly that includes a fluid source, a valve, a discharge pipe, a tank, and a check valve assembly. The fluid source is configured to be in fluid communication with an inlet on at least one meter. The fluid source also provides fluid pressure to move fluid through the at least one meter. The valve is configured to be in fluid communication with the at least one meter. The discharge pipe is fluidly coupled to an outflow side of the valve and configured to receive the fluid that passes through the at least one meter. The tank is configured to receive and collect the fluid from the discharge pipe. The check valve assembly is attached to the discharge pipe and is in fluid communication with the opening of the discharge pipe. The check valve assembly is open when the fluid pressure from the fluid source moves the fluid through the at least one meter and through the valve and acts on the check valve assembly. The fluid pressure from the fluid source is sufficient to keep moving the fluid past the check valve assembly, into the discharge pipe, and into the tank from the opening of the discharge pipe. When the fluid pressure is reduced sufficient to close the check valve assembly, the fluid is stopped from passing through the check valve assembly.

In the above and other embodiments, the water meter test bench assembly also comprises: the valve being an outlet valve; a fluid inlet valve in fluid communication with the fluid source and configured to be in fluid communication with the inlet on the at least one meter; the outlet valve being configured to be in fluid communication with the at least one meter opposite a fluid inlet valve; a bench sized to support the at least one meter; the valve being configured to be located at an outflow side of the at least one meter; when the check valve assembly is closed, the fluid is stopped from exiting the discharge pipe and entering the tank; the check valve assembly is located adjacent and in fluid communication with the opening of the discharge pipe; the check valve assembly includes a spring loaded disc biased against a valve opening portion to close the check valve assembly when the fluid pressure is reduced.

Another illustrative embodiment of the present disclosure provides a water meter test bench assembly that includes a fluid source, a discharge pipe, and a check valve assembly. The fluid source is configured to be in fluid communication with an inlet on at least one meter. The fluid source also provides fluid pressure to move fluid through the at least one meter. The discharge pipe is fluidly coupled to an outflow side of a valve and configured to receive the fluid that passes through the at least one meter. The check valve assembly is attached to the discharge pipe and is in fluid communication with the opening of the discharge pipe. The check valve assembly is attached to an outlet end of the discharge pipe. The check valve assembly is open when the fluid pressure from the fluid source moves the fluid through the at least one meter, the valve, and acts on the check valve assembly. When the fluid pressure is reduced sufficient to close the check valve assembly, the fluid is stopped from passing through the check valve assembly.

In the above and other embodiments, the water meter test bench assembly also comprises the valve configured to be in fluid communication with the at least one meter, wherein when the valve is closed, the fluid pressure is reduced sufficient to close the check valve assembly.

Additional features and advantages of the meter test bench flow stop assembly will become apparent to those skilled in the art upon consideration of the following detail description of the illustrated embodiments exemplifying carrying out the meter test bench flow stop assembly as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
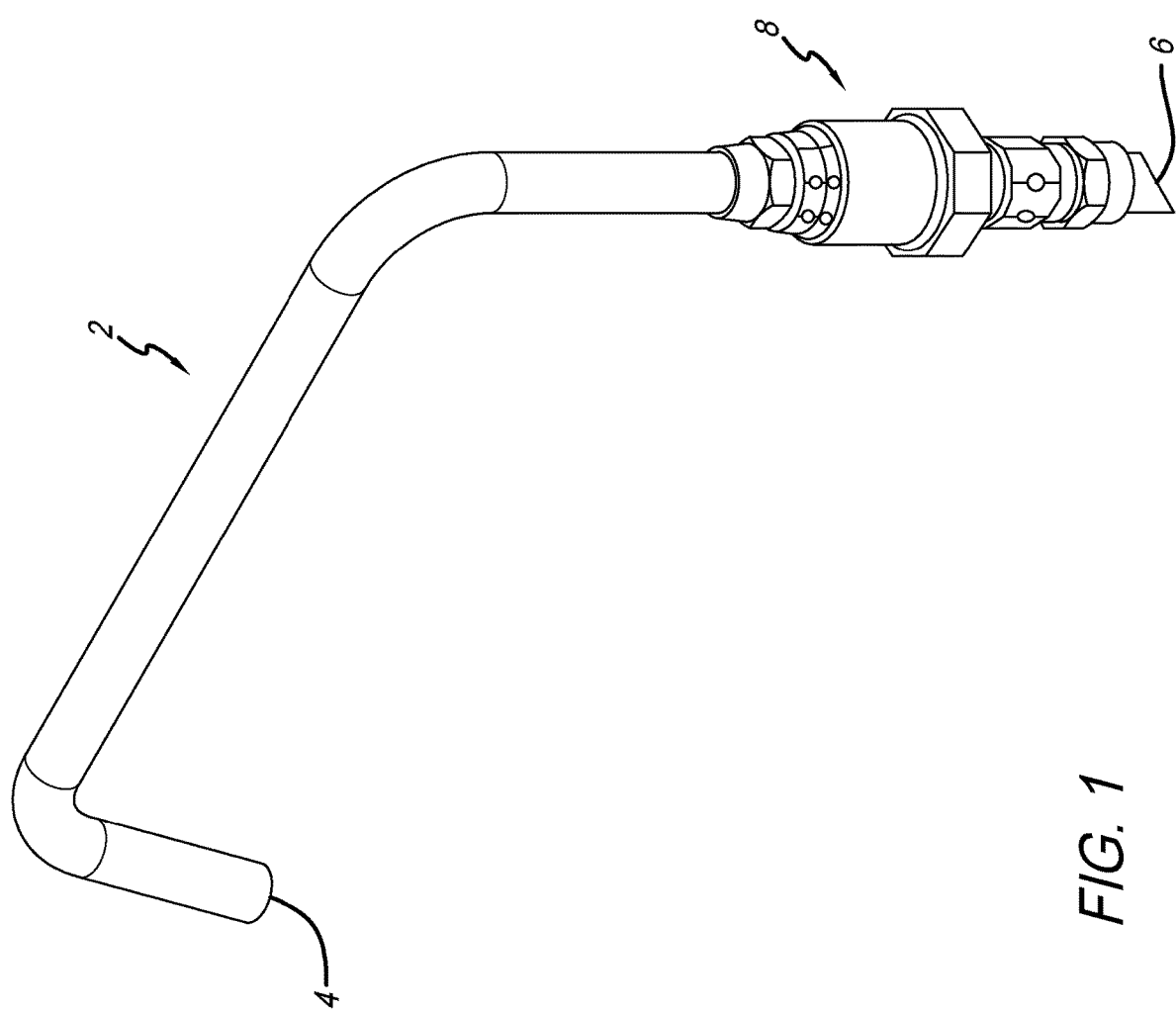
FIG. 1 is a perspective view of a discharge pipe with a flow stop assembly attached thereto.

Corresponding reference characters indicate corresponding parts throughout the several views. The exemplification set out herein illustrates embodiments of the meter test bench flow stop assembly, and such exemplification is not to be construed as limiting the scope of the meter test bench flow stop assembly, in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure includes a water meter test bench assembly as previously described. This test bench assembly, however, further includes a check valve assembly in fluid communication with the discharge pipe between the outlet valve and the opening of the discharge pipe to the tank. Illustratively, the check valve may be of poppet design that includes a spring-loaded disc. The disc covers an opening in the valve with the spring biasing against the disc toward the closed position. In other words, the disc keeps the valve closed, preventing any fluid from passing therethrough, until a force acts on the disc greater than the bias from the spring to open the valve and allow fluid to pass. In the present disclosure, pressure from the fluid source pushing fluid through the flow meters is a sufficient force to overcome the spring bias on the disc so fluid can pass through the valve and flow out of the discharge pipe and into the tank. Once the outlet valve is closed, however, that pressure from the fluid source is shut off. This means there is no longer a force acting on the fluid in the discharge pipe sufficient to keep the check valve open. The loss of pressure allows the spring bias to push the disc against the valve opening. As a result, this drop in pressure from closing the outlet valve automatically closes the check valve. Any fluid remaining after the outlet valve is closed will not deposit into the tank.

In illustrative embodiments, the check valve may be an in-line valve or other like valve that will close upon pressure drop. The valve may include a single or multiple poppet check valve designs. The check valves may also be of different sizes, 1 inch or 2 inch, for example.

A perspective view of discharge pipe 2, of the type used with a flow meter test bench, is shown in FIG. 1. Discharge pipe 2 includes an inlet opening 4 that attaches to the flow meter test bench assembly (see FIGS. 10 and 11) and is in fluid communication with fluid exiting the flow meters and through an outlet valve. A discharge pipe outlet 6 is located opposite inlet opening 4. Fluid that enters inlet opening 4 and flows through discharge pipe 2, exits discharge pipe outlet 6 (see FIGS. 10 and 11). A check valve assembly 8 is located on discharge pipe 2 between inlet opening 4 and discharge pipe outlet 6. Any fluid that exits discharge pipe outlet 6 must first pass through check valve assembly 8.

Check valve assembly 8 is configured so that as fluid pressure is applied to the fluid passing through discharge pipe 2, that pressure is sufficient to keep check valve assembly 8 open so that fluid passes through and exits discharge pipe outlet 6. When that pressure ceases, however, check valve assembly 8 will close preventing further fluid from passing therethrough and exiting discharge pipe outlet 6. Any fluid remaining downstream of the outlet valve (see FIGS. 10 and 11) will remain in discharge pipe 2 and not exit from discharge pipe outlet 6.

Figure 2:
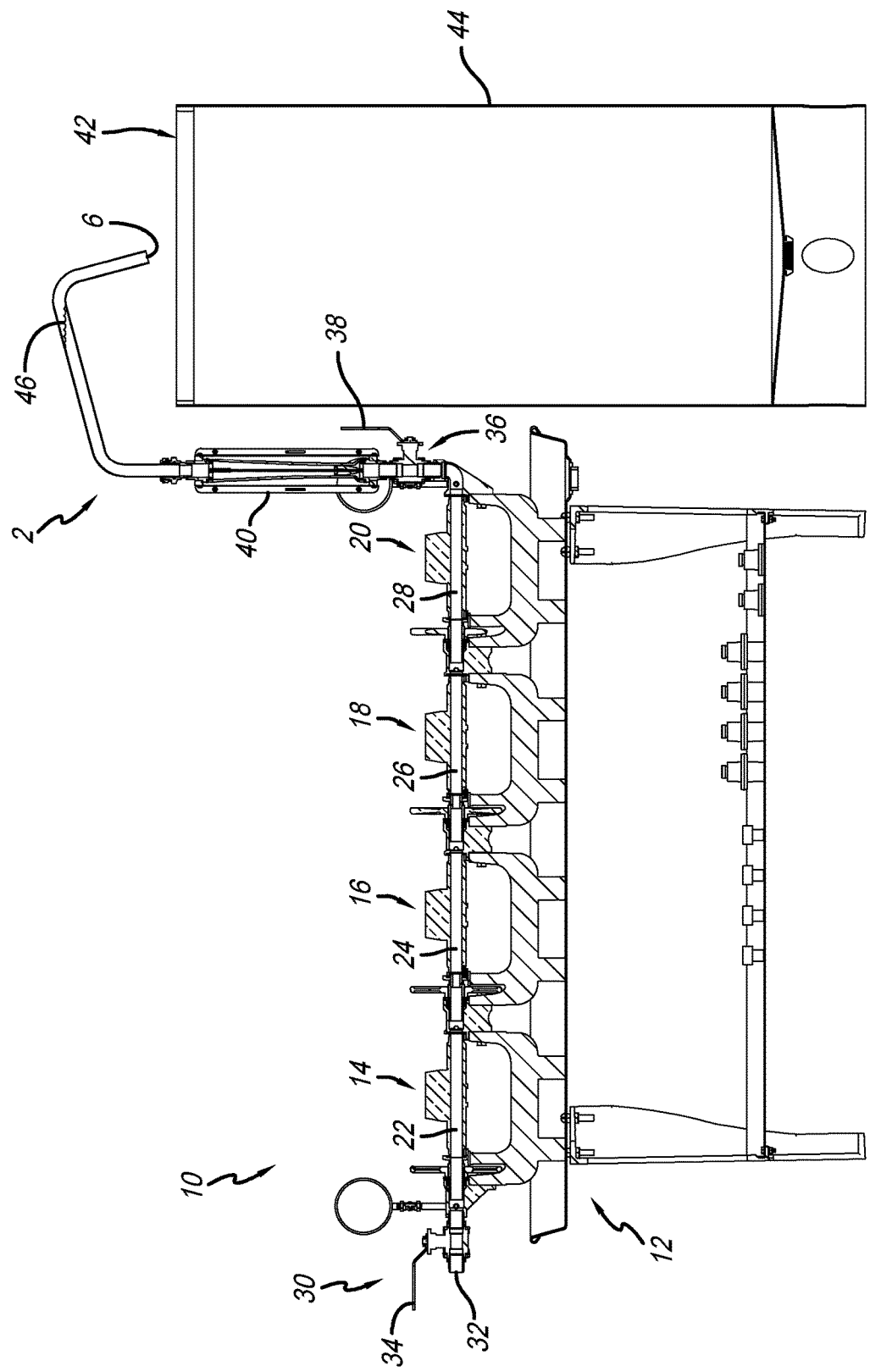
FIG. 2 is a side sectional view of a prior art flow meter test bench assembly.

To better illustrate the utility of discharge pipe 2 with check valve assembly 8 located between inlet opening 4 and discharge pipe outlet 6, a side sectional view of a prior art flow meter test bench assembly 10 is shown in FIG. 2. A bench 12 supports a plurality of flow meters, such as flow meters 14, 16, 18, and 20. It is appreciated that bench 12 may be configured to hold as few as a single flow meter or as many as multiple dozens. Even multiple rows of flow meters may be attached to a bench. Each of flow meters 14, 16, 18, and 20, shown herein, are illustratively fluidly connected together as indicated by fluid passages 22, 24, 26, and 28, respectively. An inlet valve 30 may be attached to a fluid source 32 that can selectively provide fluid, such as water, to the meters. Inlet valve 30 is in fluid communication with fluid passages 22, 24, 26, and 28 of flow meters 14, 16, 18, and 20, respectively. A valve assembly 34 may be operable to open or close the inlet valve 30 to initiate or stop the flow of fluid into fluid passages 22, 24, 26, and 28 of flow meters 14, 16, 18, 20, respectively. Again, it is appreciated that the number of flow meters attached to the bench and connected for testing is illustrative.

An outlet valve 36 is in fluid communication with fluid passages 22, 24, 26, and 28, opposite of inlet valve 30. With outlet valve 36 located between discharge pipe 2 and flow meters 14, 16, 18, and 20, fluid flow can be stopped downstream of these flow meters. A valve assembly 38 on outlet valve 36 may be moved between open and closed positions similar to valve assembly 34 of inlet valve 30 to either allow or stop flow of fluid passing therethrough. A rotameter 40, such as a Testerate Indicator available from Ford Meter Box, Wabash, Indiana, may also be located between outlet valve 36 and discharge pipe 2. Rotameter 40 is configured to provide a flow rate measurement of the fluid passing through it downstream from outlet valve 36. Discharge pipe 2 is illustratively attached in fluid communication to rotameter 40. Discharge pipe outlet 6 of discharge pipe 2 is positioned over opening 42 of discharge tank 44.

A fluid, such as water, is allowed to flow from fluid source 32 through inlet valve 30 and through fluid passages 22, 24, 26, 28 of flow meters 14, 16, 18, 20, respectively. The flow rate of the fluid passing through those flow meters is measured. When outlet valve 36 is open, fluid will continue moving from the flow meters through outlet valve 36 and rotameter 40 and into discharge pipe 2. When beginning a flow meter test, one of the first steps is to purge whatever number of meters are being tested at the time, of air. This is so that when the test begins, the flow meters will already be filled with fluid. As soon as more fluid is moved through the passages, the meters will be detecting that movement from start to finish. Accordingly, inlet valve 30 is open just long enough to allow fluid to fill all the passages up to the discharge pipe. A water level after purge 46 is shown in the drawings to demonstrate that fluid fills all the passages from inlet valve 30 up through discharge pipe 2 before the test begins. At the point shown here, all of flow meters 14, 16, 18, and 20 are charged with fluid and the flow meter test may begin.

Figure 3:
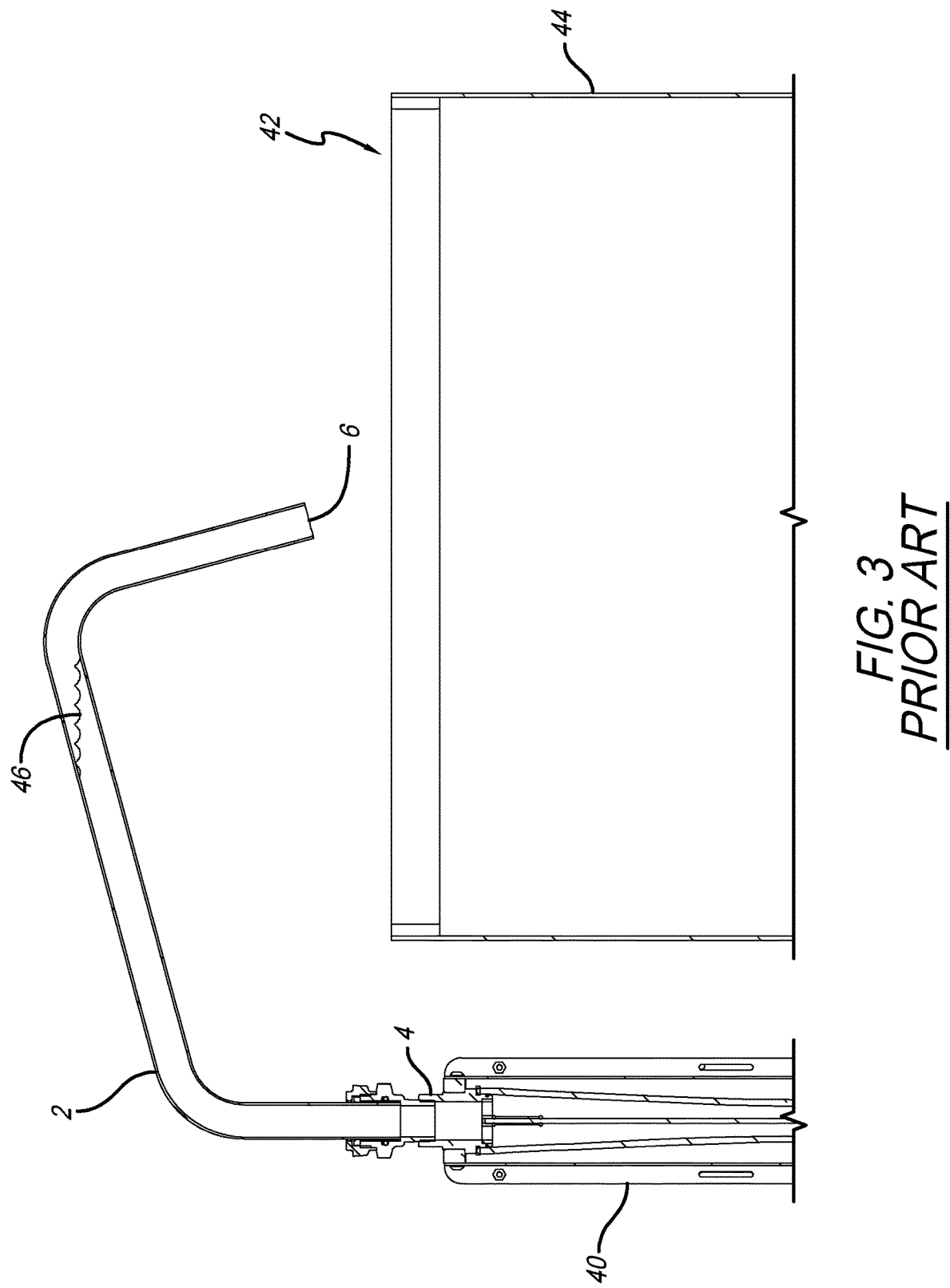
FIG. 3 is a detail view of a prior art discharge pipe and opening of the discharge tank.

A detail view of discharge pipe 2 and opening 42 of discharge tank 44 is shown in prior art FIG. 3. The water level after purge 46 is further visible in this view. As shown, the water line after purge 46 is to the point just before it can spill through discharge pipe outlet 6 of discharge pipe 2. Before the test begins, discharge tank 44 is emptied so it is holding no fluid. Also shown in this view is rotameter 40 attached at inlet opening 4 of discharge pipe 2 and in fluid communication therewith. Again, rotameter 40 will independently measure flow rate of the fluid passing between outlet valve 36 and discharge pipe 2.

Figure 4:
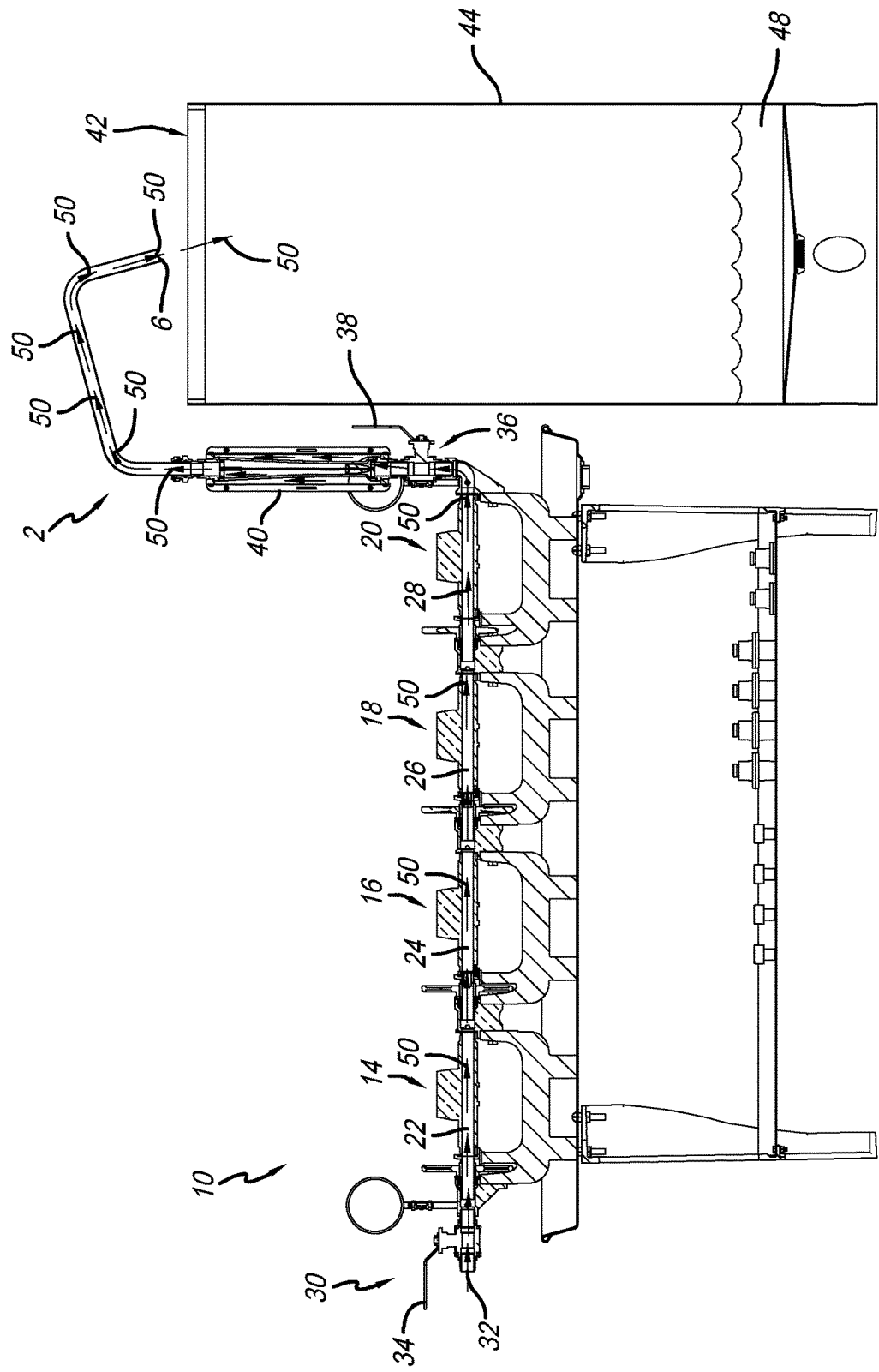
FIG. 4 is another side sectional view of the prior art flow meter test bench assembly with fluid flowing through the system from a fluid source and out of the discharge pipe and into the discharge tank.

Another side sectional view of prior art flow meter test bench assembly 10, like that shown in prior art FIG. 2, is also shown in prior art FIG. 4. The difference between the view shown in FIG. 4 from that of prior art FIG. 2, is that fluid is now flowing through the system from fluid source 32 and out of discharge pipe 2 and into discharge tank 44, as indicated by reference number 50, depositing a volume of fluid therein as indicated by reference numeral 48. This flow of fluid 50 moves through fluid passages 22, 24, 26, and 28 of flow meters 14, 16, 18, and 20, and exits discharge pipe outlet 6.

Figure 5:
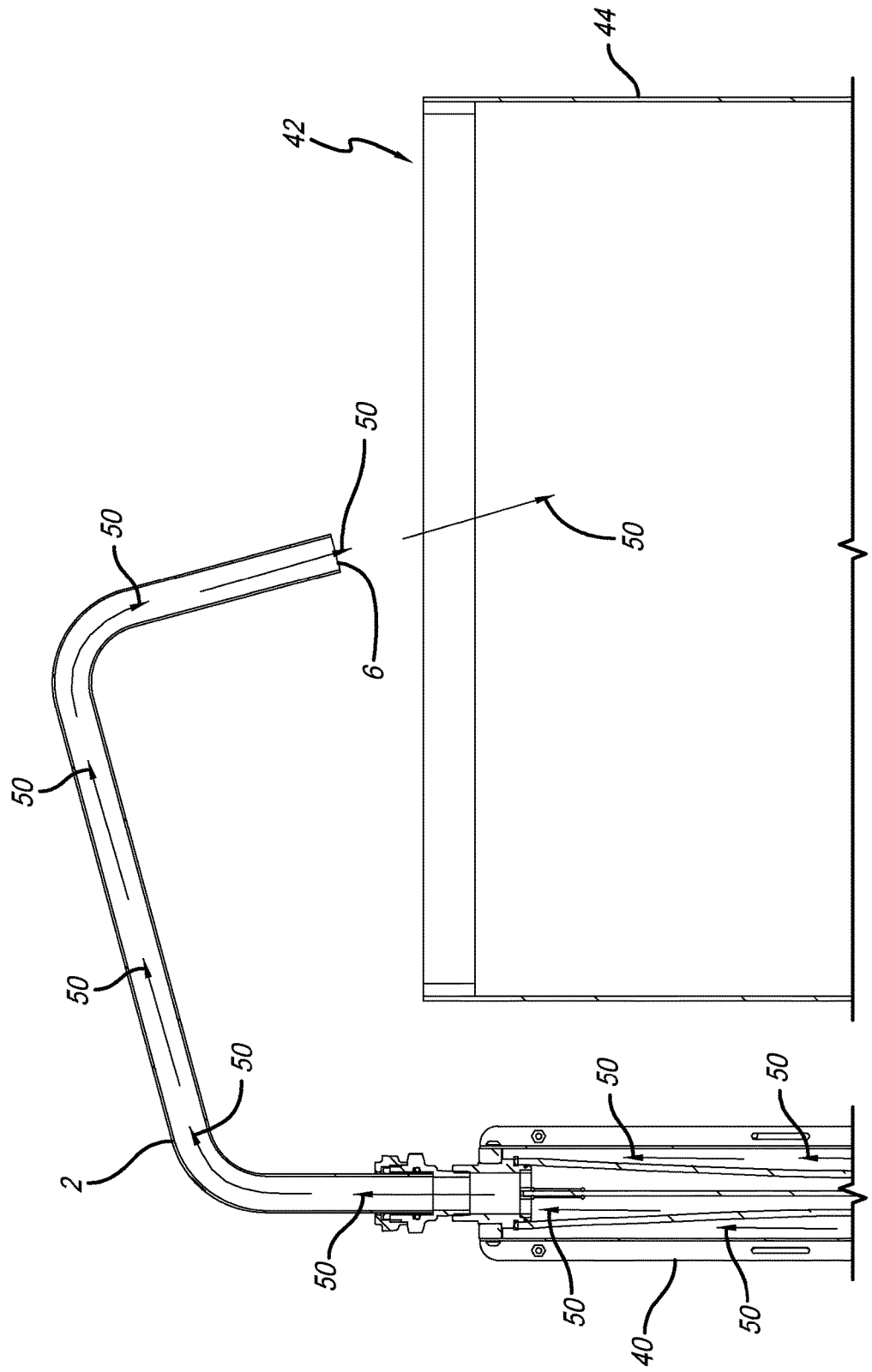
FIG. 5 is another detail view of the prior art discharge pipe and opening of the discharge tank with fluid flowing therethrough.

A detail view of discharge pipe 2 depositing the moving flow of fluid 50 into discharge tank 44 through discharge pipe outlet 6 is shown in prior art FIG. 5. This flow of fluid continues until discharge tank 44 is filled with the predetermined volume of water. At that point, valve assembly 38 of outlet valve 36 (see prior art, FIG. 4) can be manually or automatically closed to stop continued water flow at that location.

Figure 6:
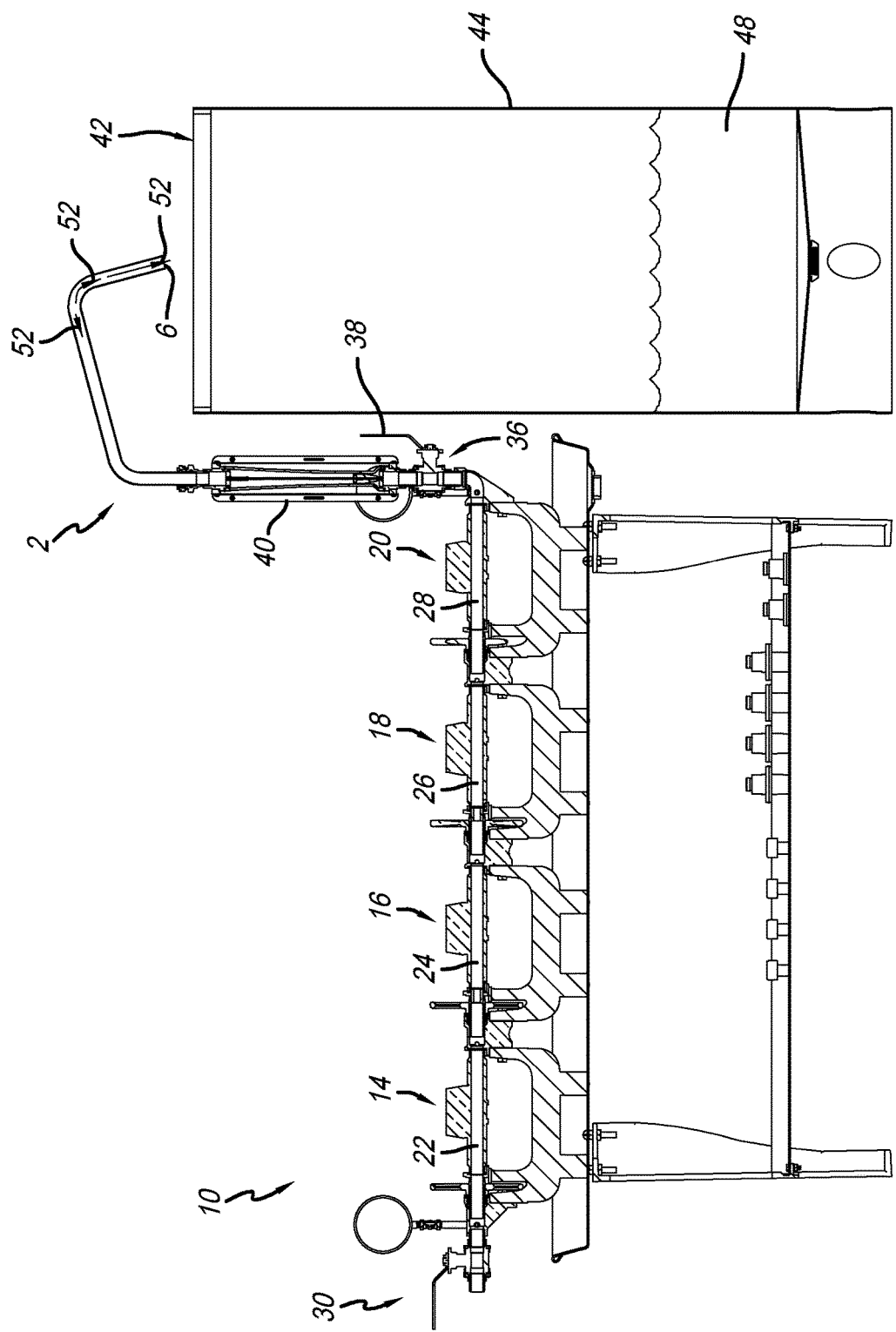
FIG. 6 is another side sectional view of the prior art flow meter test bench assembly with the outlet valve being shut off.

An additional side sectional view of prior art flow meter test bench assembly 10, like that shown in prior art FIGS. 4 and 2, is shown in prior art FIG. 6. The difference between this view and prior art FIG. 6 and FIGS. 4 and 2 is that valve assembly 38 of outlet valve 36 has been shut off. At this point, there is no longer fluid flowing through fluid passages 22, 24, 26, and 28 of flow meters 14, 16, 18, and 20, respectively. With the flow of water stopped, the final meter readings for each of flow meters 14, 16, 18, and 20, respectively, can be read. Here, with the test concluded, not only have the flow meters stopped measuring fluid flow, but also the predetermined volume of fluid 48 is held in discharge tank 44. This should allow the accuracy of the flow meters to be calculated. However, also at this point, there may be additional fluid located within discharge pipe 2.

Figure 7:
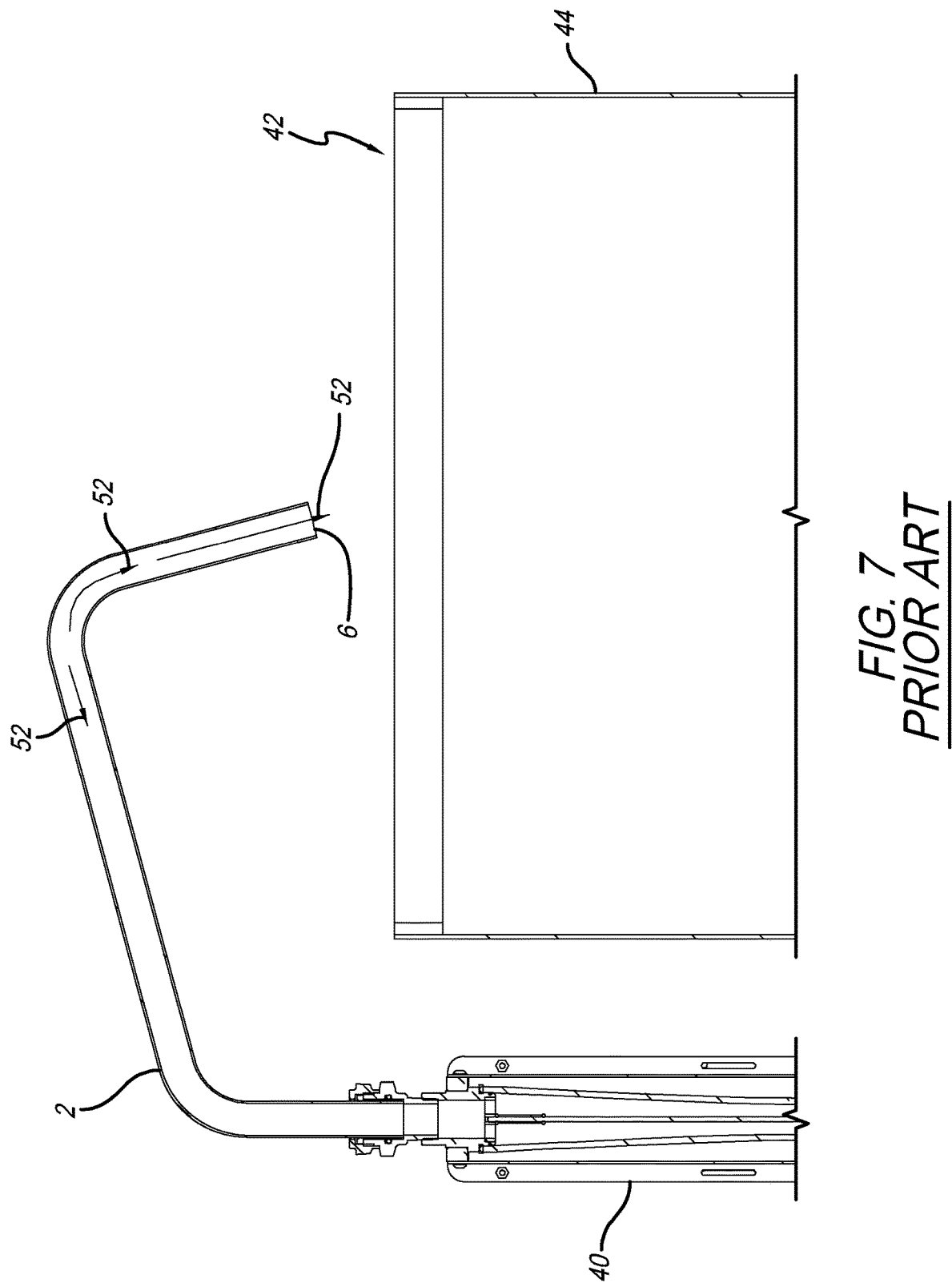
FIG. 7 is a another detail view of the prior art discharge pipe and opening of the discharge tank with the outlet valve being shut off.

As shown in prior art FIGS. 6 and 7, the additional quantity of fluid that existed in discharge pipe 2 at the time outlet valve 36 was closed may still have sufficient energy to continue flowing and exiting from discharge pipe outlet 6 of discharge pipe 2 and into discharge tank 44. This can be a problem because outlet valve 36 was closed when the predetermined volume of fluid within discharge tank 44 was collected. Additional fluid flow 52 still having energy and, thus, moving, may deposit into discharge tank 44 as well. As a result, discharge tank 44 includes a predetermined volume of water at 48 plus an additional volume of water from the incidental additional fluid flow 52. This additional fluid flow 52 may constitute several ounces or more deposited into discharge tank 44 after the predetermined volume has been reached.

Figure 8:
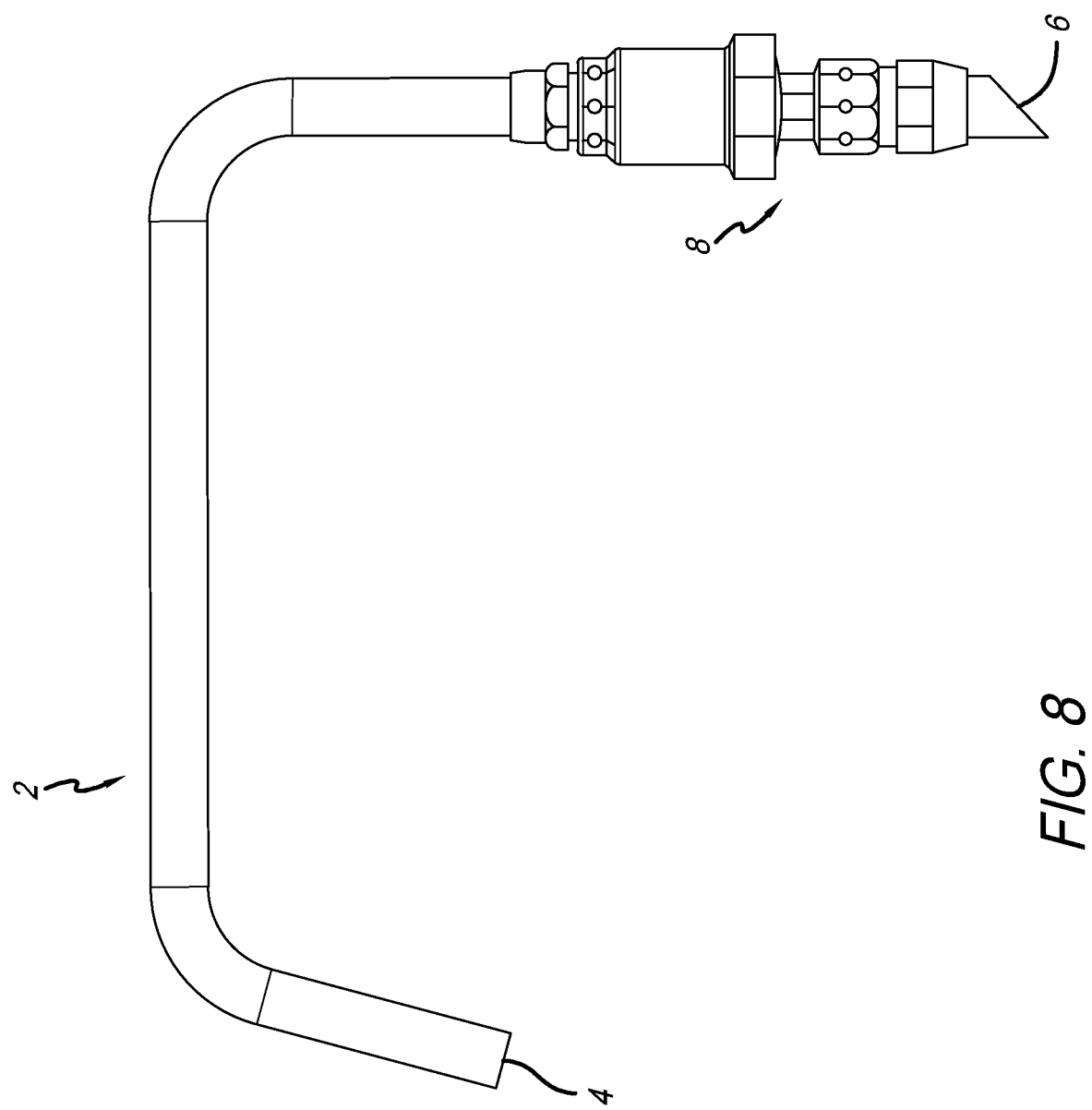
FIG. 8 is a side view of a discharge pipe with a flow stop assembly attached thereto.

A side view of discharge pipe 2, similar to that shown in FIG. 1, is shown in FIG. 8. Like in FIG. 1, discharge pipe 2, shown in FIG. 8, also includes check valve assembly 8 located between inlet opening 4 and discharge pipe outlet 6 of discharge pipe 2. Having check valve assembly 8 located between inlet opening 4 and discharge pipe outlet 6 means check valve assembly 8 can affect the flow of fluid exiting discharge pipe outlet 6. When check valve assembly 8 is closed, no fluid will be able to pass through. Thus, fluid will cease exiting discharge pipe outlet 6. By closing check valve assembly 8 when outlet valve 36 is closed, any additional water flow located within discharge pipe 2 will remain in there and not exit discharge pipe outlet 6. As a result, there will not be an additional volume of fluid added to discharge tank 44 once the predetermined volume has been reached.

Figure 9:
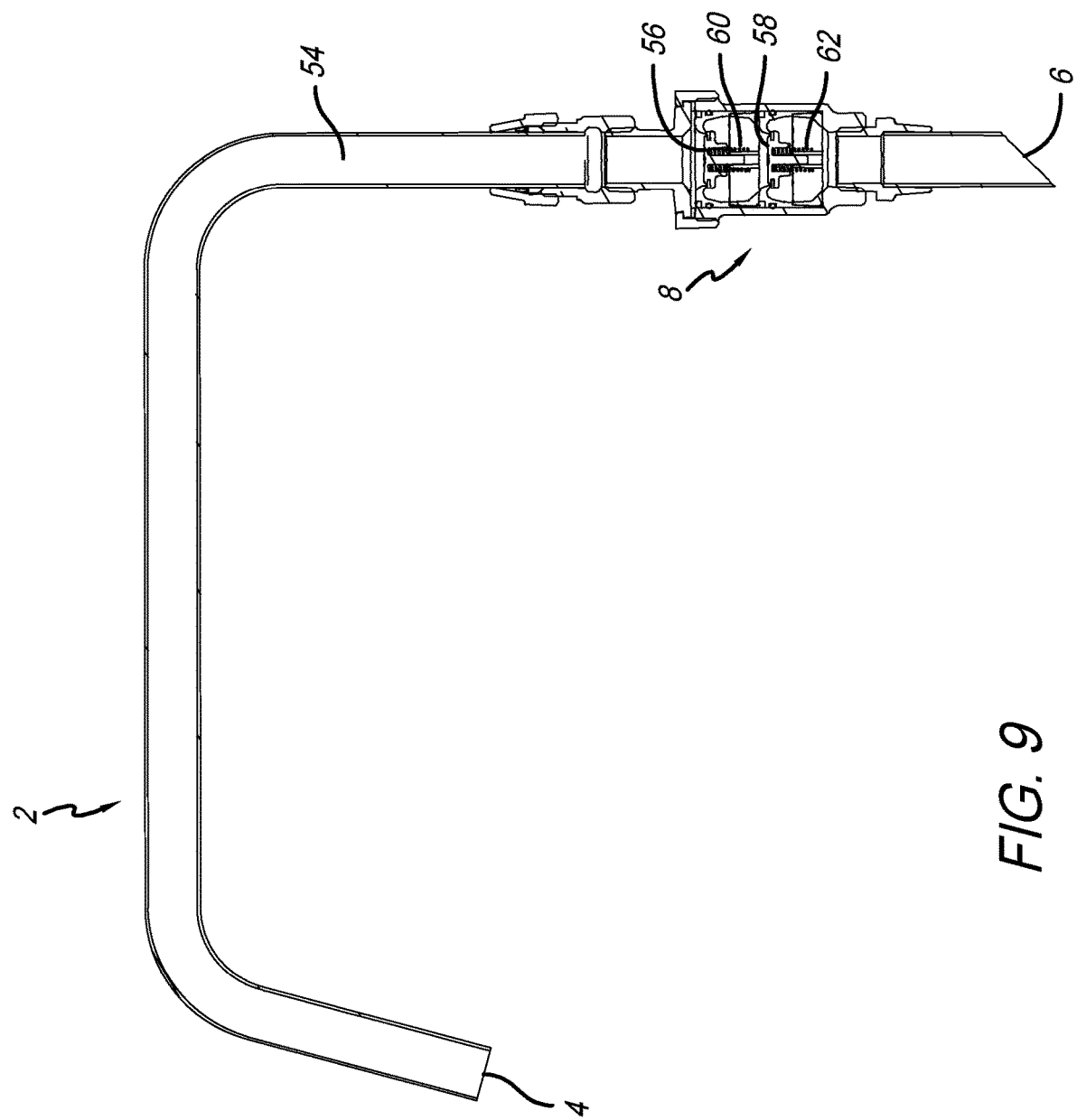
FIG. 9 is a cross-sectional view of a discharge pipe with a flow stop assembly attached thereto.

A cross-sectional side view of discharge pipe 2 is shown in FIG. 9. Here, the interior of check valve assembly 8 is shown being in fluid communication with passageway 54 that extends from inlet opening 4 to discharge pipe outlet 6. Check valve assembly 8 includes dual check valves therein biased to their closed position when there is not enough fluid pressure pushing the fluid through passageway 54 to open them. Accordingly, the check valves will be closed, preventing fluid from passing therethrough and out discharge pipe outlet 6. This occurs when valve assembly 38 of outlet valve 36 is closed.

During the flow meter test, valve assembly 34 of inlet valve 30 is open to fluid source 32, which provides the pressure that moves fluid through the flow meters. With valve assembly 38 of outlet valve 36 open as well, the fluid continues to travel through discharge pipe 2. That pressure from the fluid source is sufficient to move discs 56 and 58 of check valve assembly 8 against the bias of springs 60 and 62, respectively, to maintain an opening in check valve assembly 8, which allows fluid in passageway 54 to flow therethrough and out discharge pipe outlet 6. Once the test has concluded, and valve assembly 38 of outlet valve 36 is closed, that fluid pressure is cut off. With no more fluid pressure, despite fluid still located within passageway 54 of discharge pipe 2, springs 60 and 62 push discs 56 and 58, respectively, closed, thereby preventing any fluid from passing through check valve assembly 8 and out discharge pipe outlet 6. This prevents additional fluid from entering discharge tank 44 once outlet valve 36 is closed. As a result, the additional fluid present in passageway 54 of discharge pipe 2 will not be deposited in discharge tank 44 at the conclusion of the test. Accordingly, this additional fluid that may otherwise be deposited into discharge tank 44, which could skew the results of the test, is no longer an issue. The skilled artisan upon reading this disclosure will appreciate that check valve assembly 8 may alternatively be a single disc check valve, or any spring assisted-type valve that employs pressure to open it, as well as being self-closing to stop the water flow out of the pipe once the flow is cut.

Figure 10:
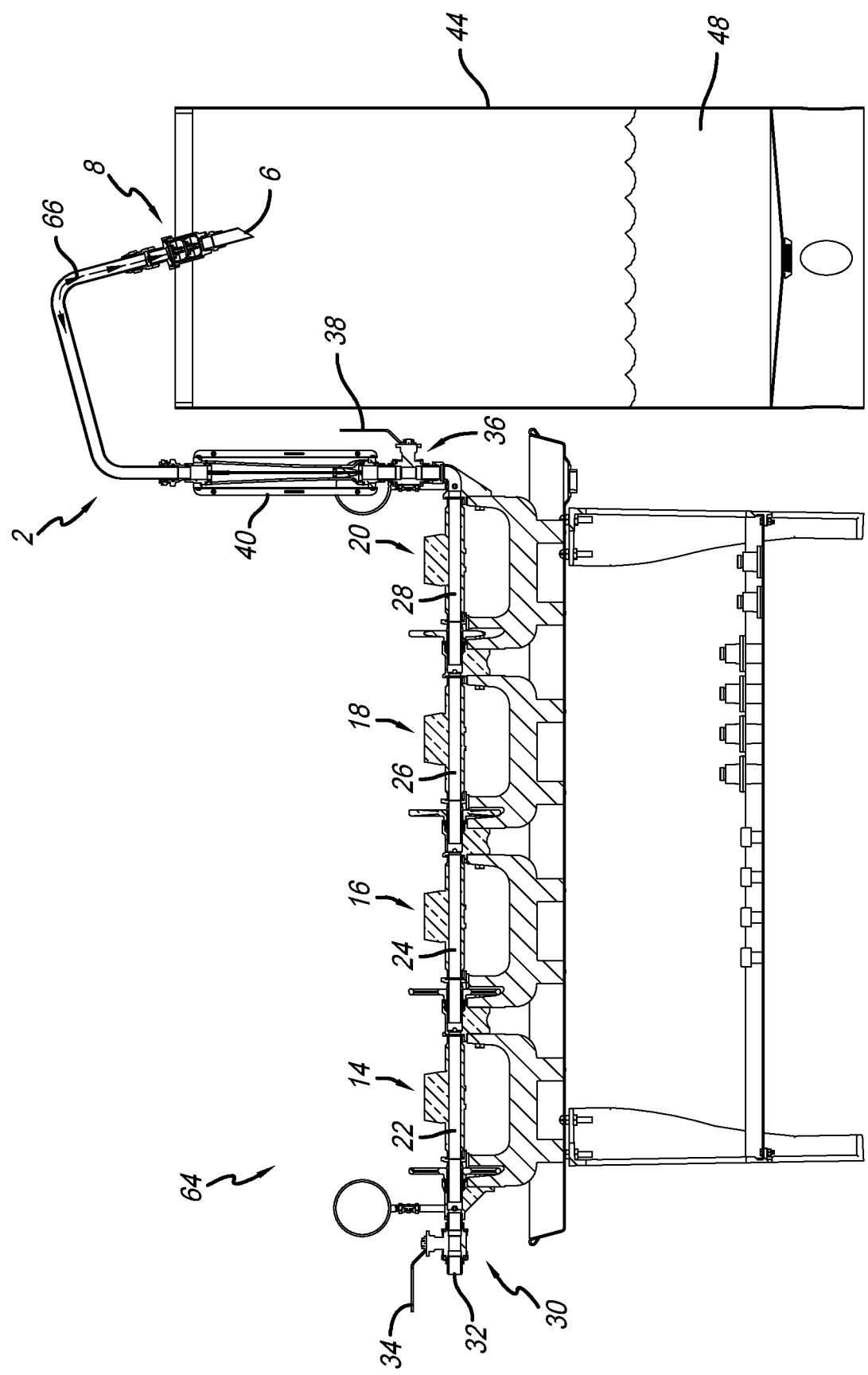
FIG. 10 is a side sectional view of a flow meter test bench assembly.

A side cross-sectional view of flow meter test bench assembly 64 is shown in FIG. 10. This flow meter test bench assembly 64 is similar to prior art test bench assembly 10 shown in FIGS. 2, 4, and 6, but with the addition of check valve assembly 8 attached to discharge pipe 2, upstream from discharge pipe outlet 6. This image further demonstrates that when valve assembly 34 of inlet valve 30 is open allowing fluid from fluid source 32 to enter fluid passages 22, 24, 26, and 28 of illustrative flow meters 14, 16, 18, 20, respectively, during a flow meter test, that fluid flows through outlet valve 36 through rotameter 40, into discharge pipe 2, pushes open check valve assembly 8 out discharge pipe outlet 6, and into discharge tank 44. As that fluid from fluid source 32 continues to flow through these passages and into discharge tank 44 during the test, check valve assembly 8 will remain open. Once the predetermined volume of fluid indicated by reference 48 has been deposited in discharge tank 44, valve assembly 38 may be manually or automatically closed to stop fluid flow from fluid source 32. At that point, check valve assembly 8 is closed due to the lack of fluid pressure from fluid source 32, preventing any remaining fluid in discharge pipe 2 from exiting same into discharge tank 44. That fluid, indicated by reference numeral 66, remains in discharge pipe 2.

Figure 11:
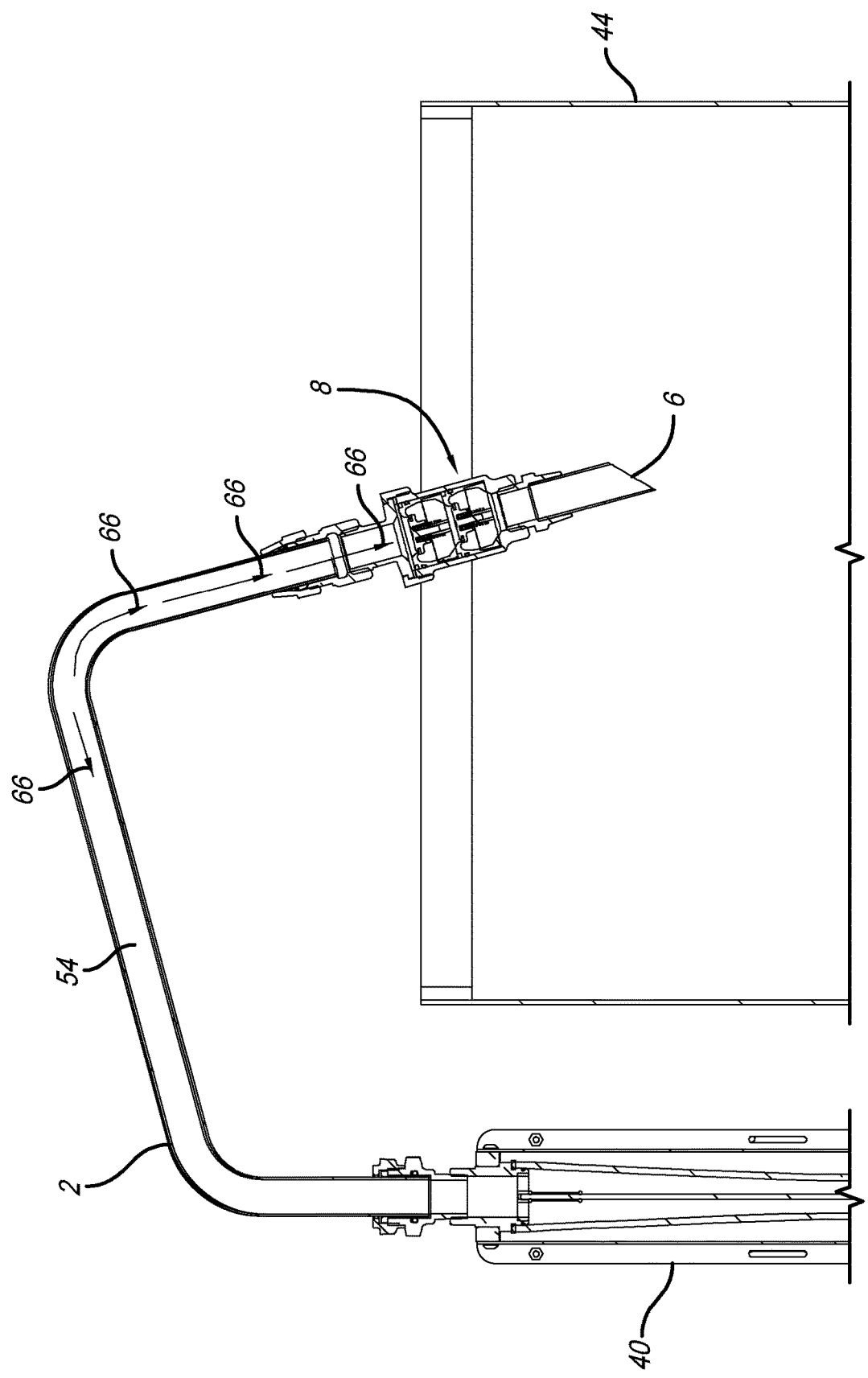
FIG. 11 is a detail view of a prior art discharge pipe and opening of the discharge tank.

As shown in the detail view of discharge pipe 2 and discharge tank 44 from FIG. 10, in FIG. 11, springs 60 and 62 bias discs 56 and 58, respectively, (see, also, FIG. 9) to close passageway 54 of discharge pipe 2, preventing fluid 66 from passing through check valve assembly 8. Again, it is the pressure supplied by fluid source 32 that is cut off by closure of outlet valve 36 that ceases the required pressure to keep check valve assembly 8 open. Such fluid 66 remains in passageway 54 and is thereby prevented from exiting discharge pipe outlet 6 and into discharge tank 44. This means no additional fluid enters discharge tank 44 once the predetermined volume has been reached and outlet valve 36 is closed.

Figure 12:
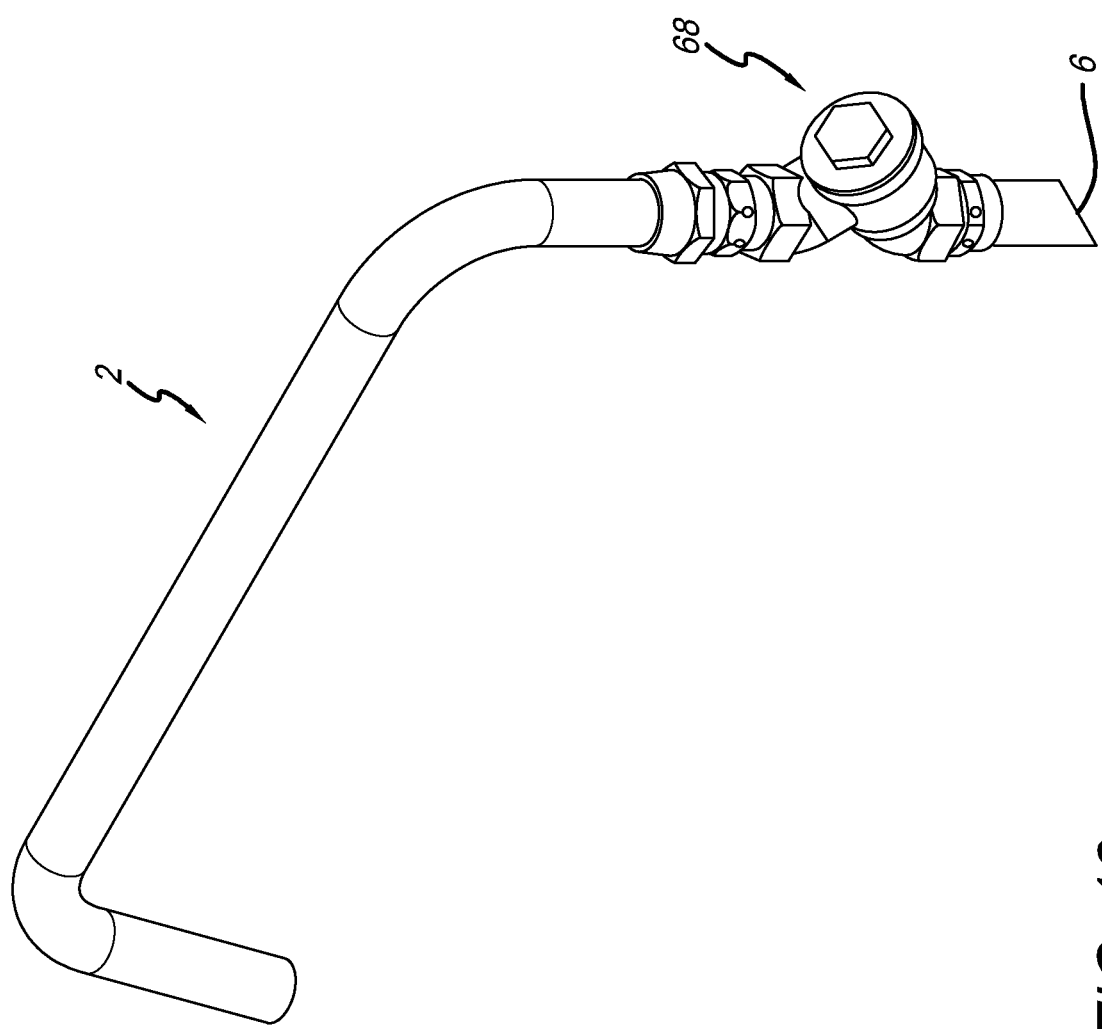
FIG. 12 is a perspective view of the discharge pipe with the flow stop assembly attached thereto.

A perspective view of discharge pipe 2, along with another embodiment of a dual check valve assembly 68, is shown in FIG. 12. It is appreciated that different check valve-type assemblies may be attached to discharge pipe 2 in order to open and close passageway 54, either at or upstream of discharge pipe outlet 6.

Figure 13:
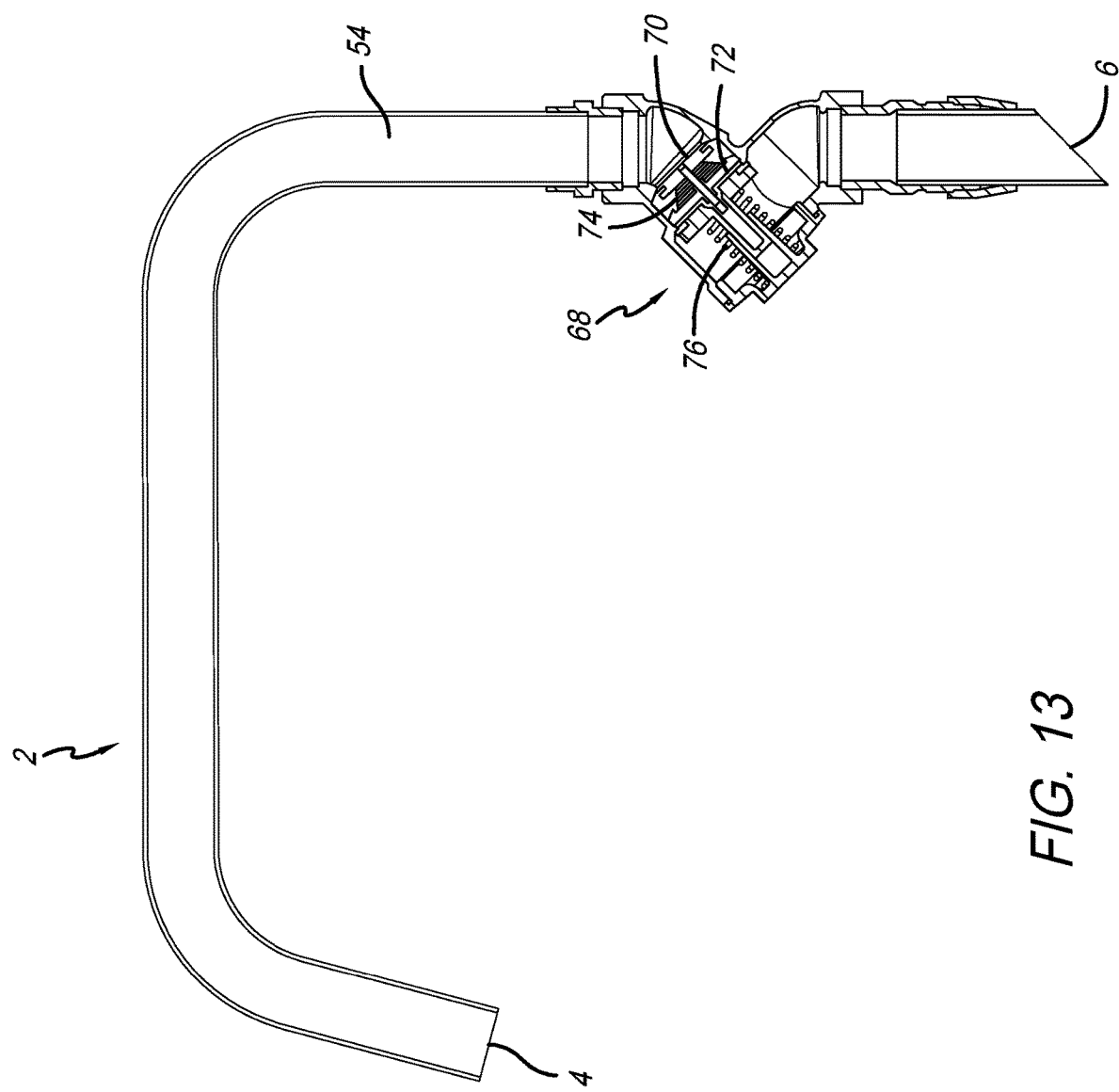
FIG. 13 is a side sectional view of the discharge pipe with the flow stop assembly attached thereto.

A side sectional view of discharge pipe 2, with dual check valve assembly 68 located between inlet opening 4 and discharge pipe outlet 6, is shown in FIG. 13. This view demonstrates how discs 70 and 72 are biased by springs 74 and 76, respectively, to keep dual check valve assembly 68 in a closed position until sufficient pressure from moving fluid through passageway 54 of discharge pipe 2 opens dual check valve assembly 68 to allow that fluid to flow therethrough and out discharge pipe outlet 6. An illustrative difference between check valve assemblies 8 and 68 is size. Check valve assembly 8 may be 1" while check valve assembly 68 may be 2". Either valve, or other valves, may work in this disclosure.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, then the disclosure from this non-provisional patent application controls.

What is claimed:

1. A water meter test bench assembly comprising:
    a bench sized to support at least one meter;
    a fluid inlet valve in fluid communication with both a fluid source and an inlet on the at least one meter;
    wherein the fluid source provides fluid pressure to move fluid through the at least one meter;
    an outlet valve in fluid communication with the at least one meter opposite the fluid inlet valve;
    wherein the outlet valve is at an outflow side of the at least one meter;
    a discharge pipe fluidly coupled to an outflow side of the outlet valve to receive the fluid that passes through the at least one meter;
    a tank that receives and collects the fluid from the discharge pipe; and
    a check valve assembly attached to and in fluid communication with the discharge pipe and the opening of the discharge pipe;
    wherein the check valve assembly is open when the fluid pressure from the fluid source moves the fluid through the at least one meter and through the outlet valve and acts on the check valve assembly;
    wherein the fluid pressure from the fluid source is sufficient to keep moving the fluid past the check valve assembly, into the discharge pipe, and into the tank from the opening of the discharge pipe; and
    wherein when the fluid pressure is reduced sufficient to close the check valve assembly, the fluid is stopped from passing through the check valve assembly.

2. The water meter test bench assembly of claim 1, wherein a reduction of fluid pressure allows a spring bias of the check valve assembly to push a member portion of the check valve assembly against a valve opening portion of the check valve assembly to close the check valve assembly, which stops the fluid from passing through the check valve assembly and collecting in the tank.

3. The water meter test bench assembly of claim 1, wherein the fluid pressure is reduced by closing the outlet valve.

4. The water meter test bench assembly of claim 1, wherein when the check valve assembly is closed, the fluid is stopped from entering the tank.

5. The water meter test bench assembly of claim 1, wherein when the check valve assembly is closed, the fluid is stopped from exiting the discharge pipe.

6. The water meter test bench assembly of claim 1, wherein the check valve assembly is located adjacent and in fluid communication with the opening of the discharge pipe.

7. The water meter test bench assembly of claim 1, wherein the check valve assembly is spaced apart from and in fluid communication with the tank.

8. The water meter test bench assembly of claim 1, wherein a member portion of the check valve assembly is a disc that is spring loaded against a valve opening portion of the check valve assembly to close the check valve assembly.

9. The water meter test bench assembly of claim 1, wherein the check valve assembly is selected from the group consisting of an inline valve, a single poppet valve, and a multiple poppet valve.

10. A water meter test bench assembly comprising:
    a fluid source configured to be in fluid communication with an inlet on at least one meter;
    wherein the fluid source provides fluid pressure to move fluid through the at least one meter;
    a valve configured to be in fluid communication with the at least one meter;
    a discharge pipe fluidly coupled to an outflow side of the valve and configured to receive the fluid that passes through the at least one meter;
    a tank configured to receive and collect the fluid from the discharge pipe; and a check valve assembly attached to the discharge pipe and in fluid communication with the opening of the discharge pipe;

wherein the check valve assembly is open when the fluid pressure from the fluid source moves the fluid through the at least one meter and through the valve and acts on the check valve assembly;

wherein the fluid pressure from the fluid source is sufficient to keep moving the fluid past the check valve assembly, into the discharge pipe, and into the tank from the opening of the discharge pipe; and wherein when the fluid pressure is reduced sufficient to close the check valve assembly, the fluid is stopped from passing through the check valve assembly.

11. The water meter test bench assembly of claim 10, wherein the valve is an outlet valve.

12. The water meter test bench assembly of claim 10, further comprising a fluid inlet valve in fluid communication with the fluid source and configured to be in fluid communication with the inlet on the at least one meter.

13. The water meter test bench assembly of claim 11, wherein the outlet valve is configured to be in fluid communication with the at least one meter opposite a fluid inlet valve.

14. The water meter test bench assembly of claim 10, further comprising a bench sized to support the at least one meter.

15. The water meter test bench assembly of claim 10, wherein the valve is configured to be located at an outflow side of the at least one meter.

16. The water meter test bench assembly of claim 10, wherein when the check valve assembly is closed, the fluid is stopped from exiting the discharge pipe and entering the tank.

17. The water meter test bench assembly of claim 10, wherein the check valve assembly is located adjacent and in fluid communication with the opening of the discharge pipe.

18. The water meter test bench assembly of claim 10, wherein the check valve assembly includes a spring loaded disc biased against a valve opening portion to close the check valve assembly when the fluid pressure is reduced.

19. A water meter test bench assembly comprising:
a fluid source configured to be in fluid communication with an inlet on at least one meter;
wherein the fluid source provides fluid pressure to move fluid through the at least one meter;
a discharge pipe fluidly coupled to an outflow side of a valve and configured to receive the fluid that passes through the at least one meter; and
a check valve assembly attached to the discharge pipe and in fluid communication with the opening of the discharge pipe;
wherein the check valve assembly is attached to an outlet end of the discharge pipe;
wherein the check valve assembly is open when the fluid pressure from the fluid source moves the fluid through the at least one meter, the valve, and acts on the check valve assembly; and
wherein when the fluid pressure is reduced sufficient to close the check valve assembly, the fluid is stopped from passing through the check valve assembly.

20. The water meter test bench assembly of claim 19, further comprising the valve configured to be in fluid communication with the at least one meter, wherein when the valve is closed, the fluid pressure is reduced sufficient to close the check valve assembly.

* * * * *